United States Patent [19]

Utsumi et al.

[11] Patent Number: 5,029,289
[45] Date of Patent: Jul. 2, 1991

[54] CHARACTER DISPLAY SYSTEM

[75] Inventors: Masashi Utsumi; Masaru Akazawa, both of Isehara, Japan

[73] Assignee: NCR Corporation, Dayton, Ohio

[21] Appl. No.: 260,557

[22] Filed: Oct. 19, 1988

[30] Foreign Application Priority Data

Dec. 21, 1987 [JP] Japan .................................. 62-321596

[51] Int. Cl.$^5$ .............................................. G09G 1/02
[52] U.S. Cl. .................................... 340/720; 340/750; 340/799; 340/814
[58] Field of Search ............... 340/720, 732, 744, 748, 340/749, 750, 789, 799, 814

[56] References Cited

U.S. PATENT DOCUMENTS

| | | | |
|---|---|---|---|
| 4,237,543 | 12/1980 | Nishio | 340/750 |
| 4,357,604 | 11/1982 | Imazeki et al. | 340/749 |
| 4,379,293 | 4/1983 | Boisvert et al. | 340/750 |
| 4,388,621 | 6/1983 | Komatsu et al. | 340/750 |
| 4,468,866 | 8/1984 | Tanaka | 340/750 |
| 4,482,979 | 11/1984 | May | 340/750 |
| 4,485,378 | 11/1984 | Matsui et al. | 340/750 |
| 4,511,965 | 4/1985 | Rajaram | 340/750 |
| 4,581,611 | 4/1986 | Yang et al. | 340/750 |
| 4,661,812 | 4/1987 | Ikeda | 340/750 |

FOREIGN PATENT DOCUMENTS 0105725 4/1984 European Pat. Off. .
59-60480 4/1984 Japan .

Primary Examiner—Alvin E. Oberley
Assistant Examiner—Richard Hjerpe
Attorney, Agent, or Firm—Wilbert Hawk, Jr.; Albert L. Sessler, Jr.; George J. Muckenthaler

[57] ABSTRACT

A synchronized timing controller has an access controller for controlling a central processing unit and a display controller of a display device to alternately access a refresh memory in a character display system. The timing controller has a clock synchronizer for recovering synchronization of both the clock for the central processing unit and the clock for the display controller automatically when a synchronizing error occurs between the clocks. When an error occurs, the clock synchronizer detects the error and inhibits the display controller from accessing the refresh memory but allows the central processing unit to access the memory by controlling the access controller during the time for recovering synchronization.

13 Claims, 6 Drawing Sheets

CHARACTER DISPLAY SYSTEM

BACKGROUND OF THE INVENTION

A display device which is used in a computer, a point of sale (POS) terminal or like equipment includes a refresh memory to store data to be displayed. The data to be displayed is written into the refresh memory by an external central processing unit (CPU) and the data thus written into the refresh memory is read out by a display controller (DC) which is provided within the display device to be displayed on a cathode ray tube (CRT) or a liquid crystal display (LCD).

In a conventional cathode ray tube (CRT) display device, it is generally known that it is necessary to repeatedly refresh the screen on the CRT, normally on the order of 50–60 times per second, in order to maintain a continuously displayed state and in the manner wherein a controller sequentially reads out all addresses in a refresh memory. In addition, it is also necessary to access the refresh memory from the central processing unit (CPU) for any modification of the screen-displayed content and for other purposes. It is in a normal operation that the display controller (DC) always accesses the refresh memory to read out the display data therefrom. In addition, it is also necessary to access the refresh memory from the external CPU in order to change the contents to be displayed (modifications) or in order to read out the display data to the outside world. Under the above mentioned circumstances, simultaneous access to the refresh memory from the CPU and the display controller (DC) sometimes causes a problem wherein the screen has a flash or a flicker and the contents to be displayed cannot be changed. However, competitive accessing the refresh memory from or by the central processing unit (CPU) and the display controller (DC) causes the flash or flicker to be generated or present on a portion of the screen.

In order to avoid competitive accessing as mentioned above, conventionally there have been proposed an asynchronous access method and a synchronous access method. Since the present invention concerns and deals with the synchronous access method, a description of the asynchronous access method is not included herein. In the synchronous access method, the time required to display one character (one character clock period) is one half the normal time. In this regard, one half of the time the CPU is allowed to access the refresh memory and the other half of the time the display controller (DC) is allowed to access the refresh memory in an alternating arrangement as assigned to the CPU and the display controller.

In order to avoid this flashing or flickering on the screen, a system clock has been developed in a manner so as to access the memory from the central processing unit during the time when the system clock is at a low level, and to access the memory from the display controller during the time when the system clock is at a high level. In the alternating arrangement of the CPU and the display controller (DC), it is seen that no competitive accessing occurs.

A synchronous access method as mentioned above is described in detail in the bulletin of Japanese Patent Application No. 109217/82 as a prior art document. In the above mentioned synchronous access method, the one character clock period is halved to access the refresh memory. In other words, the refresh memory is accessed in one half of the time required to display one character. Accordingly, in order to avoid such associated problems, it is necessary that high speed elements which are operable in one half of the time and which are required for the operation of conventional elements should be used for the refresh memory and for any peripheral circuits thereof.

Recently, it is known that a one-chip (packaged IC) CPU, a one-chip display controller (DC), and a one-chip memory, which devices or elements operate at a relatively high speed, have been marketed and are available at relatively low costs. Accordingly, the use of the high speed, single chip elements which came into question in the conventional synchronous access method causes no serious problem.

However, a character display system of the sychronous access method in which the above mentioned one-chip central processing unit (CPU) and the one-chip display controller (DC) are employed can be associated with or be subject to a problem in the operation of the system.

The character display system of the above mentioned type which is subject to such problem will now be described. The one-chip CPU prepares its own system clock therewithin and the one-chip display controller also prepares its own memory clock therewithin. In the CPU, the memory clock is similar to the system clock in the manner that it is a clock for controlling the timing of accessing the refresh memory, so that such clock is hereinafter referred to as the system clock. The CPU and the display controller (DC) are so constructed as to access the refresh memory, respectively, when each of their own system clocks is high. Accordingly, the operation is initialized so that the system clocks are 180° out of phase with each other in order to avoid simultaneous accessing of the refresh memory by the CPU and the display controller. However, the clocks are prepared or initialized independently of each other by their respective counters within the CPU and the display controller, so that one of the system clocks sometimes may be inverted by reason of the influence of electrostatic discharge noise and the like. It is now assumed that noise occurs at a certain point and only the system clock of the display controller is inverted. The system clock is again inverted at the next rising edge of the basic clock, so that the CPU clock becomes in phase with the display controller clock. As a result, the access timings of the CPU and the display controller (DC) entirely coincide with each other. The coincidence of both system clocks causes such a problem that neither the CPU nor the display controller can access the refresh memory. In a conventional display, once such coincidence as mentioned above occurs, the display is temporarily reset to re-initialize both clocks. However, the resetting of the display during the time that data is being written from the CPU causes error in writing. As a result, such a problem requires that an operator check and correct the contents to be displayed after resetting the display.

In this connection, it is to be noted that the above mentioned Japanese Patent Application No. 109217/82 does not touch on a situation wherein both system clocks coincide with each other. In addition, as far as the inventors of the present invention have knowledge, no conventional technique and/or prior art which intend to solve the above mentioned problem have been found.

In the prior art and as another proposed solution to these draw-backs, there has been proposed a technique described in Japanese Laid-Open Patent Specification No. 66,989/83 wherein reference clocks in the central processing unit and the cathode ray tube controller are synchronized in alternating manner. This alternating manner is arranged so as to permit the memory access from the CPU only during the time when the reference clock of the CRT controller is at a low level, and to permit the memory access from the CRT controller only during the time when the reference clock of the controller is at a high level, thereby avoiding the competitive accessing from or by the CPU and the CRT controller. However, in this arrangement, the reference clock in the CRT controller is also divided into halves so as to assign individual halved periods as access time of the CPU and the CRT controller, respectively. As to refresh memory access and the associated peripheral circuit elements, it was necessary to use high speed elements capable of operating at least in a period which is one-half the conventional period, in an overall arrangement similar to that described above. Further, the reference clocks of the CPU and the CRT controller have been controlled so as to operate in synchronized manner in order to avoid such competitive accessing with the result that the structure of the control unit and the peripheral units was complicated or complex in nature.

Further documentation in the field of video display systems includes U.S. Pat. No. 4,237,543, issued to Y. Nishio et al. on Dec. 2, 1980, which discloses a microprocessor controlled display system having a data control unit including a microprocessor and an associated memory, a refresh memory unit connected to the data control unit through an address bus and a data bus, and a video control unit for accessing display data stored in the refresh memory unit by a timing control unit to produce a video signal. The refresh memory unit comprises memories sectioned by byte, an I/O controller which receives a read/write control signal to indicate whether the access by the data control unit is read access or write access, and an access memory specifying signal to indicate one or two byte memory access to produce an I/O control signal, and a memory controller responsive to the I/O signal to control data access to the memories.

U.S. Pat. No. 4,379,293, issued to C. Boisvert et al. on Apr. 5, 1983, discloses a CRT controller connected to a processor and having a refresh address generator to refresh display on the CRT, an update address generator to update information in refresh memory, and a control circuit for connecting the update address generator and the refresh address generator to refresh the memory so that only one of the generators has control of the refresh memory at a time.

U.S. Pat. No. 4,388,621, issued to S. Komatsu on Jun. 14, 1983, discloses a drive circuit for a character and graphic display device wherein a clock signal is selected such that a time period during which a RAM is connected to a timing signal generator is extended and a time period during which the RAM is connected to a CPU is shortened without changing the period. This clock signal is used to acutate a switching circuit for the RAM.

U.S. Pat. No. 4,468,662, issued to K. Tanaka on Aug. 28, 1984, discloses a display apparatus having a picture memory with characters to be displayed on a CRT display monitor, a CPU of a controller for the picture memory, and a CRT controller for generating timing signals.

U.S. Pat. No. 4,482,979, issued to G. A. May on Nov. 13, 1984, discloses a video computing system with automatically refreshed memory connected to a CRT. A CRT controller is connected to the memory and a CPU operates on an alternating, two phase fetch and execute cycle.

U.S. Pat. No. 4,485,378, issued to K. Matsui et al. on Nov. 27, 1984, discloses display control apparatus wherein a refresh memory is used such that the respective areas thereof storing portions of the character are addressed in synchronism with the period of a character clock.

U.S. Pat. No. 4,511,965, issued to B. Rajaram on Apr. 16, 1985, discloses a video random access memory (RAM) accessing system for resolving the contention between the CPU and the CRT controller in accessing the memory. The CPU-CRT controller accessing sequence is modified to provide a CPU access period between successive CRT controller access periods.

And, U.S. Pat. No. 4,581,611, issued to C. C. Yang et al. on Apr. 8, 1986, discloses a character display system including a CRT of long persistence time along with a control unit, a CPU and a CRT controller. A video inhibit signal is generated for a predetermined period of time by the control unit to avoid flicker or flashing on the screen of the CRT during refreshing.

SUMMARY OF THE INVENTION

The present invention relates to display devices and systems and, more particularly, to a display unit for use with data processing or like systems. Further, the present invention relates to a character displaying system of a synchronous access method in which a central processing unit (CPU) and a display controller (DC) alternately access a refresh memory in accordance with a basic clock.

The character displaying system includes a basic clock from which is generated a system clock for the CPU and a system clock for the DC. The refresh memory is coupled to a display section and to a switching section, in turn coupled to the CPU and to the DC.

An access controlling section is included in the display system and comprises a phase shift detecting section adapted to detect a phase shift in the clocks, a switch controlling section adapted to switch from a mode wherein the CPU accesses the refresh memory to a mode wherein the DC accesses the refresh memory. The access controlling section also includes a phase shift correcting section adapted to correct a phase shift upon occurrence thereof whereby when a phase shift is detected by the phase shift detecting section, the switch controlling section inhibits access of the DC to the refresh memory and permits only access by the CPU to the refresh memory. During such time of access only by the CPU and simultaneously therewith, the phase shift is automatically corrected by the phase shift correcting section.

In accordance with the present invention, there is provided a character display system of the synchronous access type comprising a basic clock generating section, a refresh memory adapted to store display data, a central processing unit coupled to said refresh memory and adapted to prepare a first system clock signal in accordance with a basic clock signal sent from said basic clock generating section and to access said refresh memory in accordance with said system clock signal thereby accessing said display data stored in said refresh memory, a display controller adapted to prepare a second system clock signal which is 180° out of phase with said first system clock signal to cyclically read out said display data from said refresh memory in accordance with said second clock signal thereby refreshing a display on a screen, phase shift detecting means adapted to detect a state when said system clock signals are in phase with each other to output a phase shift detecting signal, switch controlling means adapted to couple said CPU with said refresh memory during the time said system clock signals are in phase with each other in response to said phase shift detecting signal, and phase shift correcting means adapted to correct the phase shift of said system clock signals in response to said phase shift detecting signal, whereby when a phase shift occurs between said system clock signals, said phase shift is detected and corrected, and said CPU accesses said refresh memory during the time of correction of said phase shift.

In accordance with the above discussion, a principal object of the present invention is to provide a display system capable of displaying an image and maintaining operating time without use of high-speed and complex refresh memory means and peripheral circuit elements.

Another object of the present invention is to provide a CRT display device having a refresh memory accessible by a central processing unit and by a display controller in alternating manner.

An additional object of the present invention is to provide a CRT display device of simple construction and utilizing a synchronous access system operably associated with central processing means and with display controller means.

A further object of the present invention is to provide an access control unit in a display system which selects the controlling unit and the address bus, connects a data line of memory with the data bus of the CPU, and generates a correction signal for correcting any phase shift of clock signals.

Additional advantages and features of the present invention will become apparent and fully understood from a reading of the following description taken together with the annexed drawing.

DESCRIPTION OF THE PREFERRED EMBODIMENT

Figure 1A:
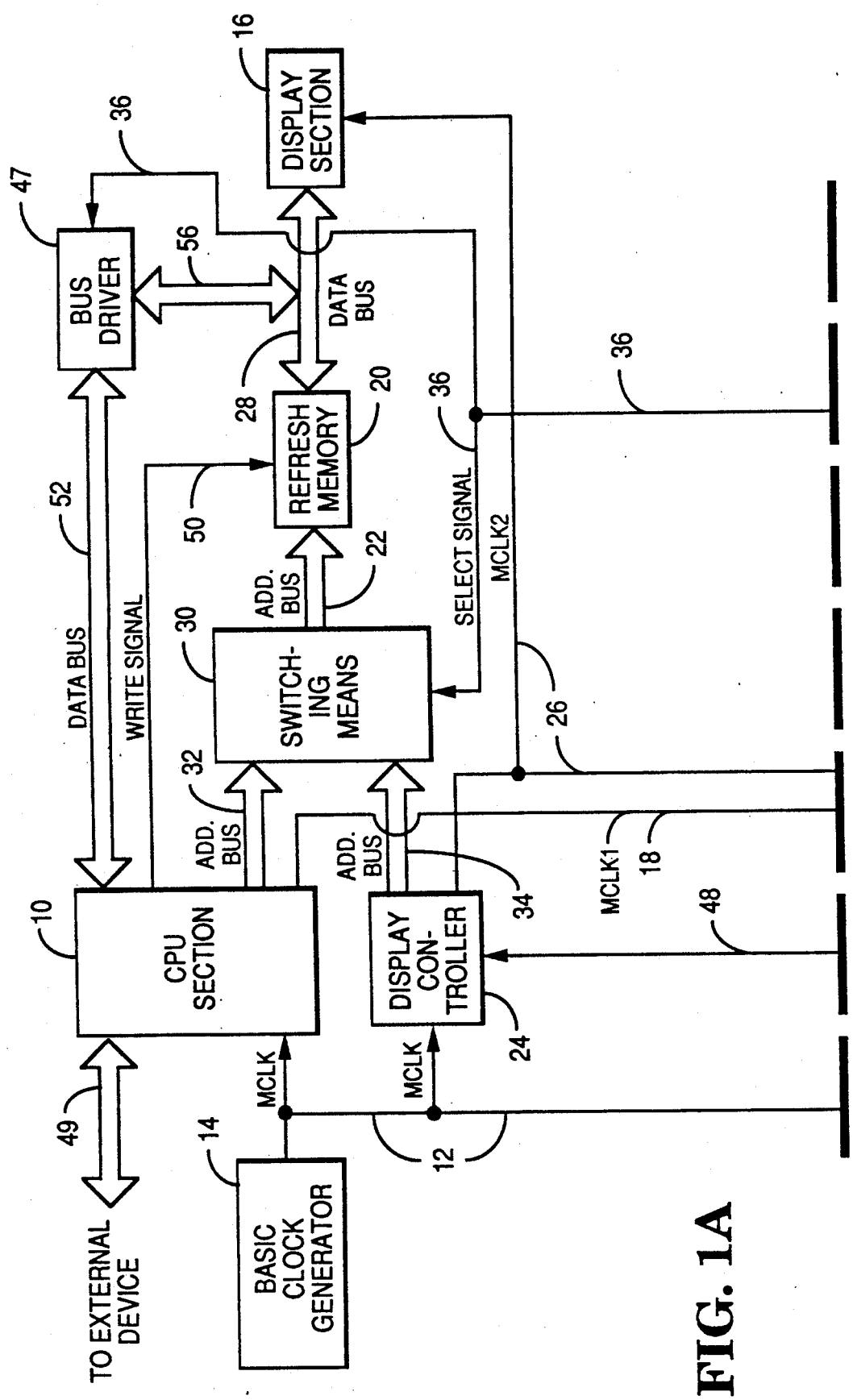
FIGS. 1A and 1B, taken together, constitute a block diagram illustrating the diagrammatic structure of the display system according to the present invention.
Figure 1B:
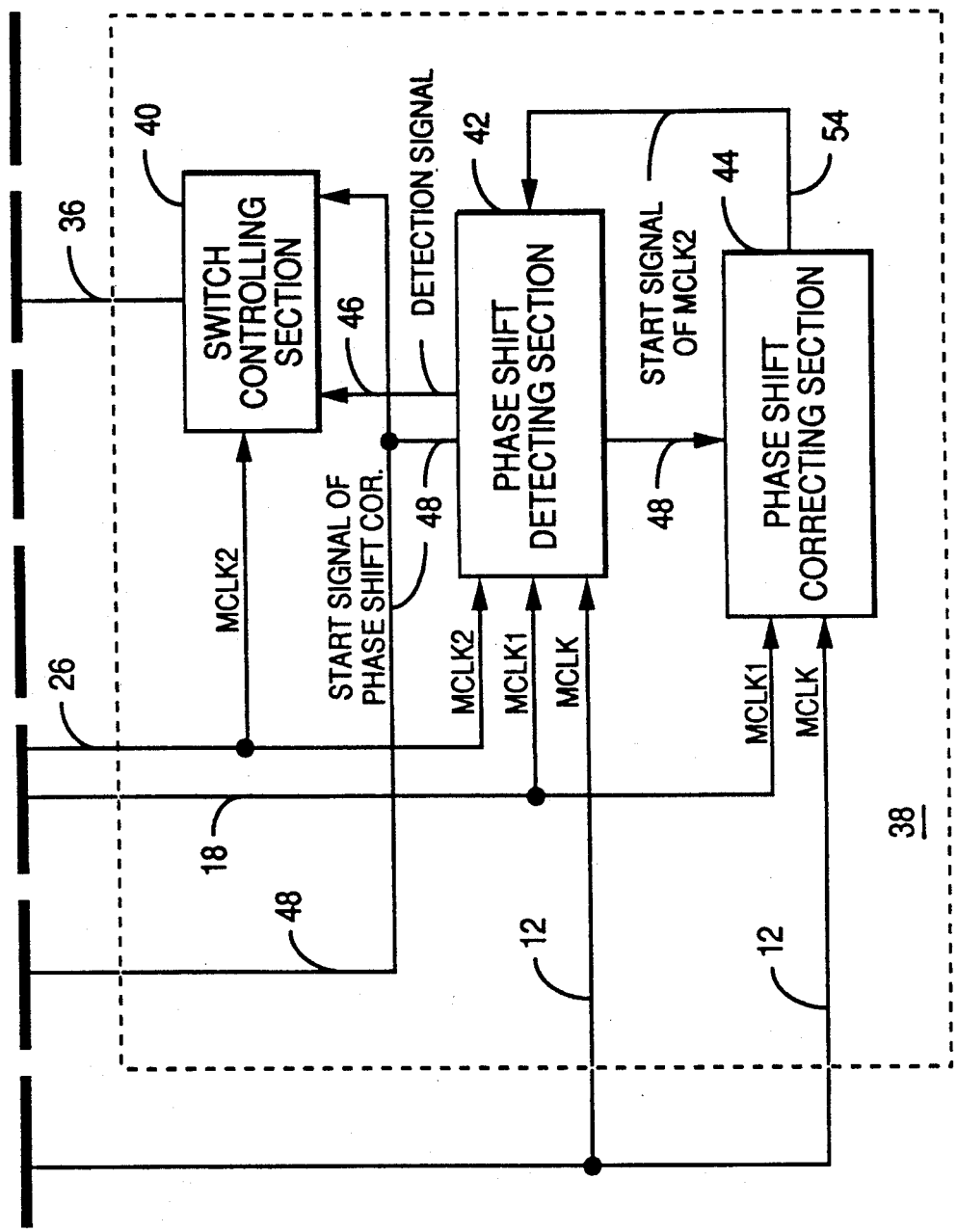

FIGS. 1A and 1B constitute a block diagram illustrating the diagrammatic structure of an embodiment of the present invention wherein 10 is a central processing unit or CPU section using a basic clock signal MCLK as the reference or basic clock signal on line 12 generated by a basic clock generator 14.

The CPU or central processing unit section 10 is normally positioned outside a display device or display section 16 and constitutes a single or one-chip device essentially including therein a microprocessor, ROM, RAM, and a counter for generating a system clock signal on line 18 designated as MCLK1. A single or one-chip device which includes the just mentioned items is available from Hitachi, Ltd. as No. HD6301 derived from the Motorola 6800 CPU series.

The CPU section 10 is operated such that display data is input thereinto by means of a keyboard (not shown). The CPU section 10 writes the data thus received into a refresh memory 20, or the CPU section reads out display data which is in the refresh memory 20 and transmits such display data to other places (not shown). The refresh memory 20 is adapted to store the data written thereinto by the CPU section 10 and required to be transmitted to the display section 16. The refresh memory 20 functions mainly (90% or more of the time) to read out the display data in order to refresh the display on a CRT screen (not shown) of the display section 16. In this regard, the refresh memory 20 is normally set so as to read out an address designated as an address bus 22 unless a write signal is received from the CPU section 10.

A display controller 24 is adapted to cyclically read out the display data from the refresh memory 20 in order to refresh the display on the CRT screen of the display section 16. The display controller 24 is a single or one-chip device essentially including therein various circuits for refreshing operations and a counter (not shown) for generating a system clock signal 26 designated as MCLK2. A single or one-chip device used as the display controller 24 and including the just mentioned circuits is available from Hitachi, Ltd. as a liquid crystal display element timing controller No. HD63645F. The display data thus read out from the refresh memory 20 by the display controller 24 is sent on a data bus 28 from the refresh memory 20 to the display section 16. The display section 16 includes a display screen (not shown), a vertical/horizontal synchronous circuit, and a CRT or liquid crystal display (LCD) to display the display data received from the refresh memory 20 via the data bus 28 onto the display screen.

Switching means 30 is adapted to selectively switch the connection between the address bus 22 and an address bus 32 to the connection between the address bus 22 and an address bus 34 or vice versa. The address bus 32 and the address bus 34 are coupled as inputs to the switching means 30 from the CPU section 10 and from the display controller 24, respectively. The switching means 30 operates so as to connect either the address bus 32 or the address bus 34 with the address bus 22 in accordance with a select signal sent on line 36 from an access controlling section 38 (FIG. 1B).

Numeral 38 denotes the access controlling section which is adapted to control the access of the CPU section 10 and the display controller 24 to the refresh memory 20. The access controlling section 38 essentially consists of a switch controlling section 40, a phase shift detecting section 42 and a phase shift correcting section 44. The switch controlling section 40 switches the select signal on line 36 to coincide with either the system clock MCLK1 signal on line 18 or the system clock MCLK2 signal on line 26 in order to change the connection of the address buses 32 and 34 to coincide with the access timings of the CPU section 10 and of the display controller section 24. In the present invention the system clock MCLK2 on line 26 is selected as the clock to coincide with the select signal on line 36.

The select signal is sent on line 36 from the switch controlling section 40 to the switching means 30 to change the connection between either the address buses 22 and 32 or the address buses 22 and 34. The select signal on line 36 is also sent to a bus driver 47 to enable the bus driver 47 only in those situations when the CPU section 10 accesses the refresh memory 20.

The phase shift detecting section 42 (FIG. 1B) monitors whether or not a phase shift occurs between the system clocks MCLK1 and MCLK2. When a phase shift is detected, the phase shift detecting section 42 outputs a detection signal on line 46 to the switch controlling section 40, and also outputs a start signal of phase shift correction on line 48, respectively, to the phase shift correcting section 44, to the switch controlling section 40 and to the display controller 24. The switch controlling section 40 actuates the switching means 30 by means of the select signal on line 36 in a manner such that only the address bus 32 from the CPU section 10 is connected with the address bus 22 in response to seeing the detection signal on line 46 from the phase shift detecting section 42. The phase shift correcting section 44 corrects the phase shift in response to the start signal of phase shift correction on line 48 from the detecting section 42. The basic clock generator 14 (FIG. 1A) is adapted to output the basic clock MCLK to the CPU section 10, to the display controller 24 and to the access controlling section 38 (FIG. 1B). The CPU section 10 and the display controller 24, respectively, prepare or initialize their own system clocks MCLK1 and MCLK2 in accordance with the basic clock MCLK.

Figure 5:
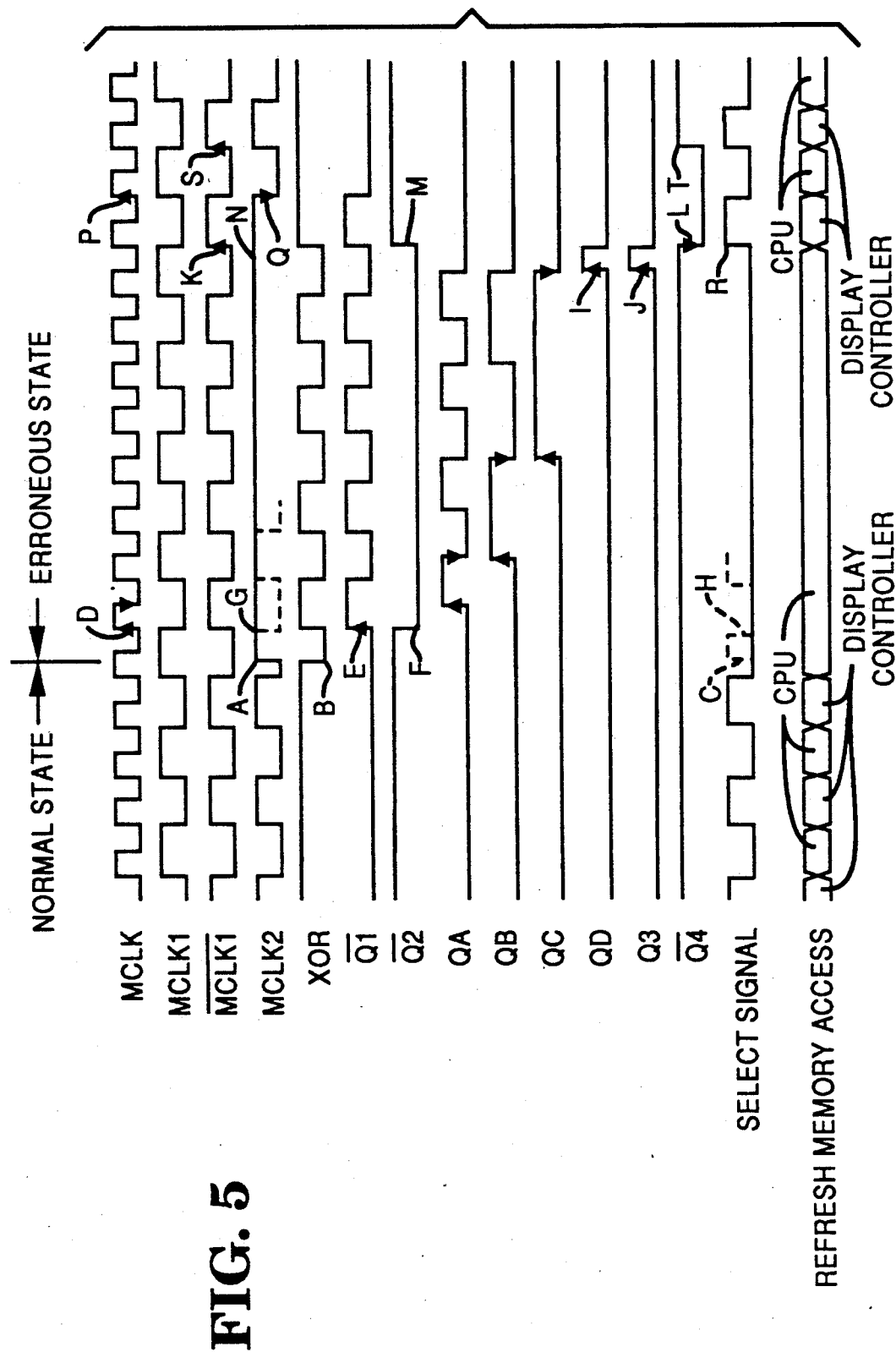
FIG. 5 is a timing chart of the operation of the logic diagram shown in FIGS. 4A and 4B.

In the operation of the present invention, the system clock signals MCLK1 and MCLK2 are initialized by the CPU section 10 and the display controller 24, respectively, so as to be 180° out of phase with each other, as shown by the timing diagram in FIG. 5. The CPU section 10 and the display controller 24 access the refresh memory 20 in accordance with their own system clocks MCLK1 and MCLK2. When the system clocks MCLK1 and MCLK2 are prepared, the switch controlling section 40 in the access controlling section 38 (FIG. 1B) outputs the select signal on line 36 which goes either to a high signal or to a low signal in synchronism with the system clock MCLK2. The select signal thus output on line 36 by the switch controlling section 40 is transmitted to the switching means 30. The switching means 30 selects either the address bus 32 or the address bus 34 in accordance with the high or the low select signal transmitted on line 36 and connects the bus thus selected to the address bus 22. In this embodiment, when the select signal on line 36 is high, the address bus 34 from the display controller 24 is connected to the address bus 22. When the select signal on line 36 is low, the address bus 32 from the CPU section 10 is connected to the address bus 22. The select signal on line 36 is also transmitted to the bus driver 47 to enable the bus driver 47 only when the select signal is low.

It is now assumed that display data is sent from an external device (not shown) through a bus 49 to the CPU section 10 in order to display the data on the screen (not shown) of the display section 16 or to change the displayed contents on the screen. When the system clock MCLK1 is high, the CPU section 10 sends a write signal on line 50 to the refresh memory 20 and sends the display data on a data bus 52 coupling the CPU section 10 and the bus driver 47. In the normal state, when the system clock MCLK1 is high, the select signal on line 36 is low, so that the address bus 32 of the CPU section 10 is connected to the address bus 22 by the switching means 30. At that time, the bus driver 47 is enabled with the low select signal on line 36. Accordingly, the display data on the data bus 52 is written into an address, designated by the address bus 32, within the refresh memory 20.

Next, the refreshing operation of the display on the screen by the display controller 24 will be described. The refreshing operation is performed by cyclically reading out the display data from the refresh memory 20 by means of the display controller 24. The display controller 24 reads out the display data for one screen at a rate of about 50 to 60 times per second in order to refresh the display on the screen. The display controller 24 accesses the refresh memory 20 when the system clock MCLK2 is high. The select signal on line 36 is also high when the system clock MCLK2 is high, so that the address bus 34 of the display controller 24 is connected to the address bus 22 by the switching means 30. Since the select signal 36 is high, the bus driver 47 is disabled and hence the data bus 52 is disconnected from the data bus 28 of the refresh memory 20. A data bus 56 connects the bus driver 47 and the data bus 28.

As has been described above, the refresh memory 20 continuously executes the data reading operation unless the write signal on line 50 is sent to the refresh memory 20 from the CPU section 10. Accordingly, the display data in the refresh memory 20 is read out from an address designated by the address bus 34. The display data thus read out is sent on the data bus 28 to the display section 16 to be displayed on the display screen (not shown). The system clock MCLK2 also is input into the display section 16. The display section 16 displays the data received from the data bus 28 on the screen only when the system clock MCLK2 is high, so that the display of the data on the data bus 28 can be avoided when the CPU section 10 writes or reads data from the refresh memory 20.

Next, the operation of a phase shift occurrence will be described. The phase shift detecting section 42 of the access controlling section 38 (FIG. 1B), into which the system clocks MCLK1 and MCLK2 are input, monitors whether or not a phase shift occurs. When a phase shift occurs, the phase shift detecting section 42 detects the occurrence of the phase shift and sends the detecting signal on line 46 to the switch controlling section 40. When the select signal on line 36 goes low, upon the receipt of the detection signal on line 46 from the phase shift detecting section 42, the switching means 30 connects the address bus 32 of the CPU section 10 to the address bus 22 to enable the bus driver 47. Simultaneously therewith, the phase shift detecting section 42 generates a start signal of phase shift correction on line 48 to the phase shift correcting section 44, to the switch controlling section 40 and to the display controller 24. The switch controlling section 40 keeps the select signal on line 36 low during the time it receives the start signal of phase shift correction on line 48. Accordingly, after the detection of the phase shift, access to the refresh memory 20 is possible only from the CPU section 10.

The display controller 24 (FIG. 1A) receives the start signal of phase shift correction on line 48 to start the operation for the phase shift correction. The phase shift correcting section 44 generates a start signal of system clock MCLK2 on line 54 at the time of rising of the system clock MCLK1 when a predetermined period of time has passed after the receipt of the start signal of phase shift correction on line 48. The start signal of clock MCLK2 is sent on line 54 to the phase shift detecting section 42 which stops outputting the start signal of phase shift correction on line 48 after receipt of the start signal of clock MCLK2. When the outputting of the start signal of phase shift correction on line 48 stops, the switch controlling section 40 turns to a state wherein the select signal on line 36 can be changed in accordance with the system clock MCLK2. Also, when the outputting of the start signal of phase shift correction on line 48 stops, the display controller 24 causes the system clock MCLK2 to start in the high state. The start signal of clock MCLK2 on line 54 goes high at the time of falling of MCLK1, so that the system clock MCLK2 is started at the time when the system clock MCLK2 is 180° out of phase with the system clock MCLK1. The switch controlling section 40 then switches the select signal on line 36 in accordance with the system clock MCLK2. Thus, the phase shift between the system clocks MCLK1 and MCLK2 is corrected and the phase shift correcting operation is completed. It is seen that during the phase shift correcting operation, it is possible to access the refresh memory 20 from the CPU section 10, so that any display data which is input from an external device can be correctly written into the refresh memory 20.

Figure 2:
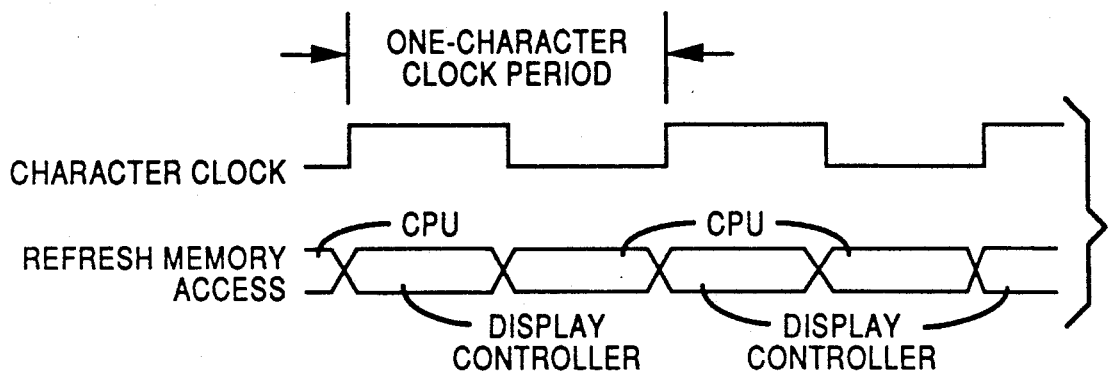
FIG. 2 is a timing diagram showing the time of access to the refresh memory of the display system.

FIG. 2 is a timing diagram which illustrates a one-character clock period and the time of access of the refresh memory 20 by the CPU section 10 and alternately by the display controller 24.

Figure 3:
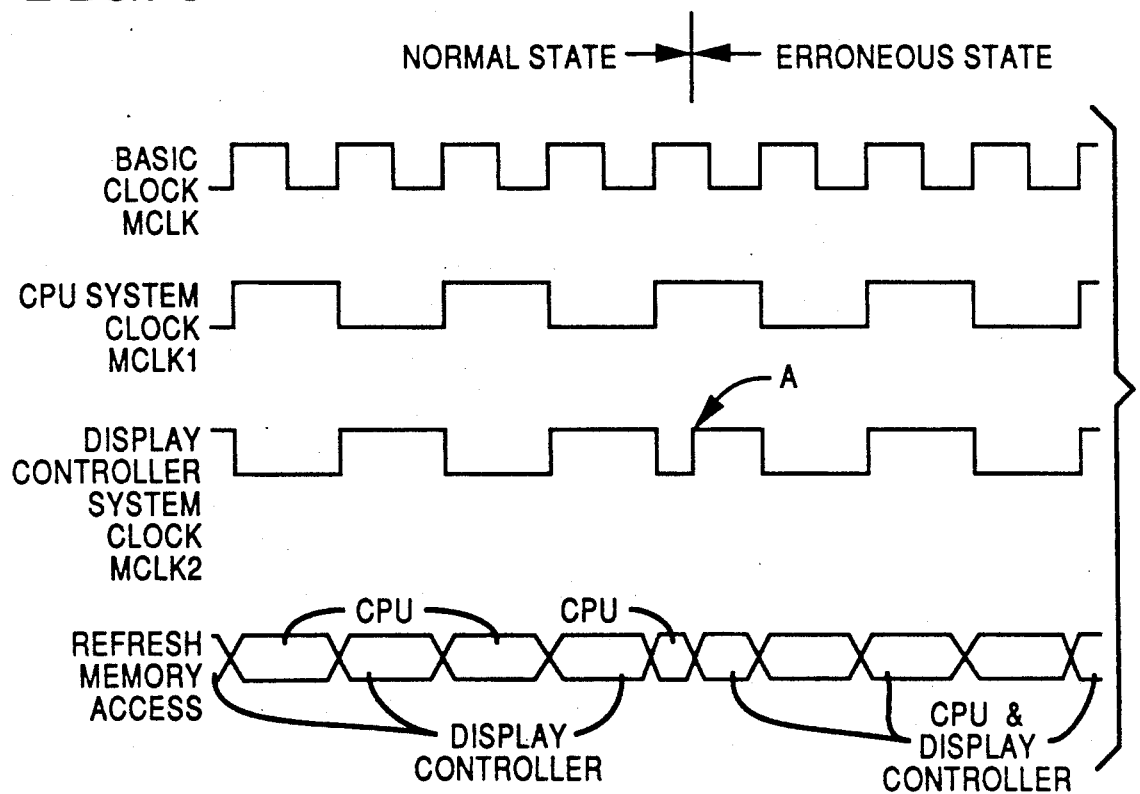
FIG. 3 is a diagram illustrating a phase shift between the system clocks of the central processing unit and of the display controller.

FIG. 3 is a diagram which illustrates a phase shift between the system clock MCLK1 of the CPU section 10 and the system clock MCLK2 of the display controller 24. The basic clock MCLK and the CPU system clock MCLK1 are shown in normal pattern and state of condition. The display controller system clock MCLK2 is shown in a normal state until a phase shift is detected at Point A and the continuity of access is interrupted. FIG. 3 also illustrates time of access by the CPU section 10 and alternately by the display controller 24 during the normal state. During the erroneous state, the CPU section 10 provides access to the refresh memory 20 until the phase shift is corrected.

Figure 4A:
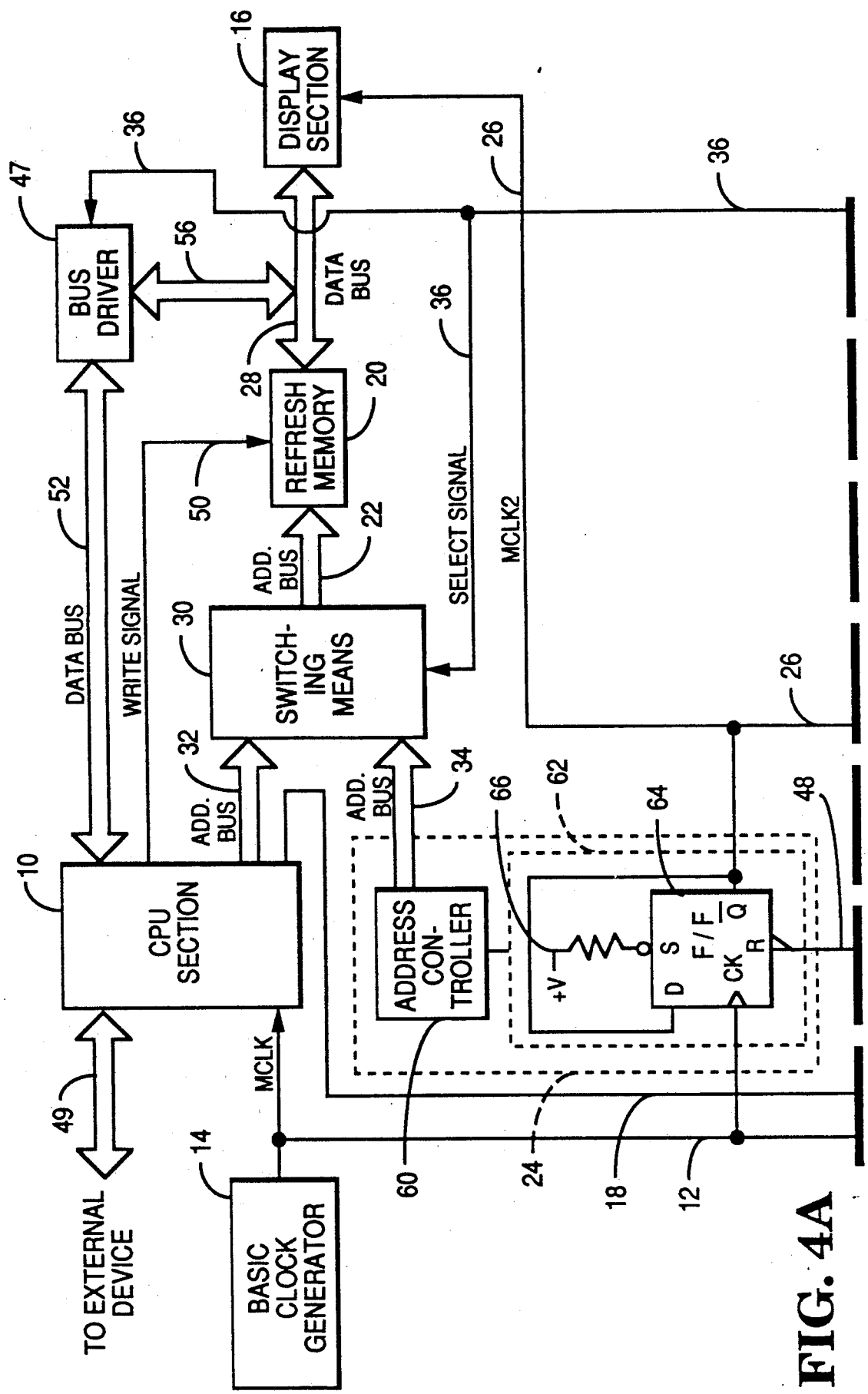
FIGS. 4A and 4B, taken together, constitute a logic diagram of the access control unit of FIGS. 1A and 1B and show the arrangement and relationship between the control unit and the peripheral elements thereof.
Figure 4B:
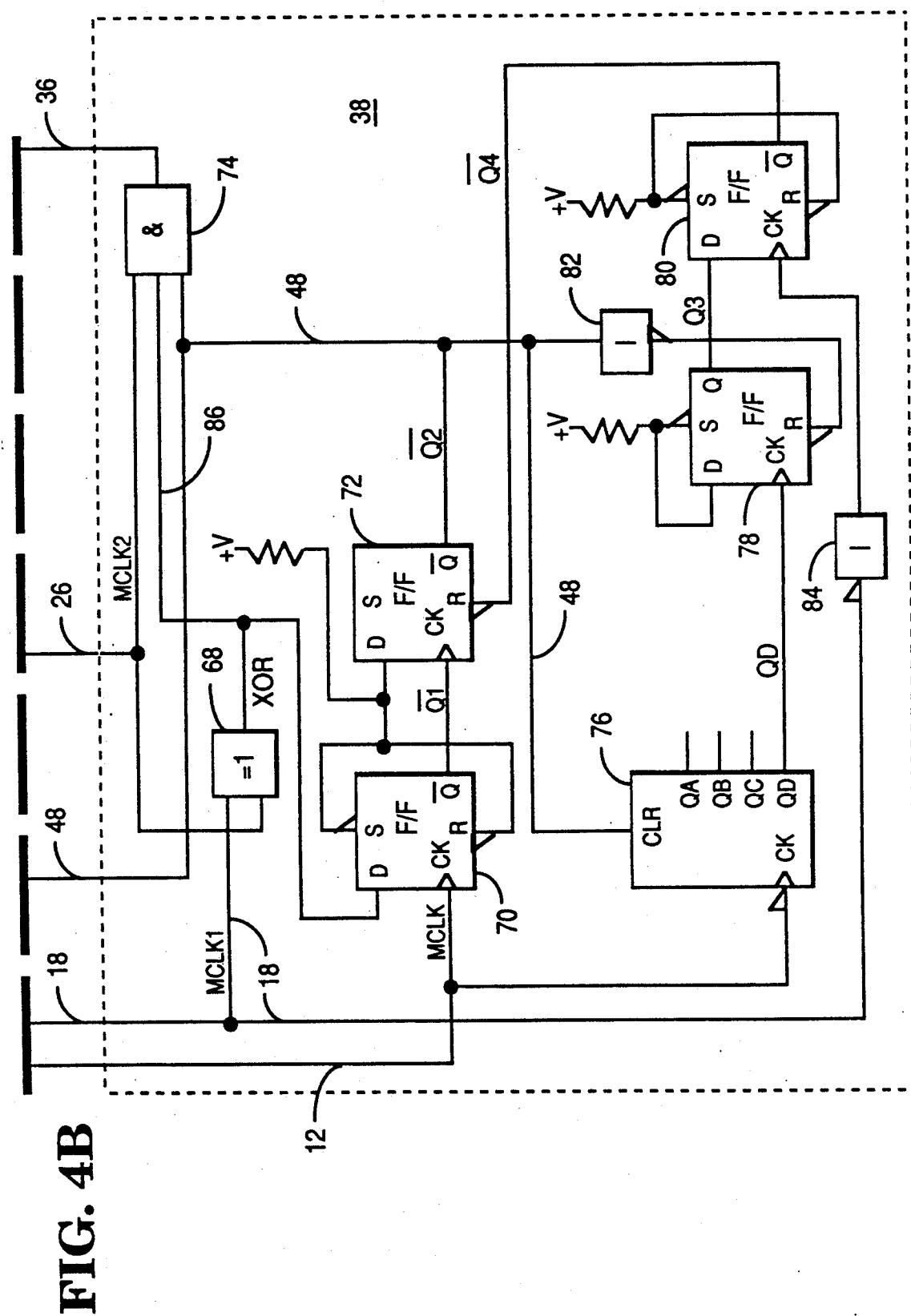

Next, the monitoring of the synchronous state between the system clocks MCLK1 and MCLK2 from the CPU section 10 and the display controller 24, and the detection and correction of out-of-synchronism of both system clocks will be described in detail with reference to FIGS. 4A, 4B and 5. FIGS. 4A and 4B provide a diagram showing the relationship between the logic of an embodiment of the access controlling section 38 in FIGS. 1A and 1B and the constituent elements within the single chip display controller 24 and the peripheral devices thereof. FIG. 5 is a timing chart illustrating the operation of the circuits shown in FIGS. 4A and 4B.

In FIG. 4A, the display controller 24 consists of an address controller 60 and a clock controlling section 62. The address controller 60 includes various controlling circuits (not shown) for the refreshing operation. When the refresh memory 20 is connected with the address buses 34 and 22, the address controller 60 operates so as to read out the display data in the refresh memory 20 while automatically counting up the addresses one by one to refresh the display. The clock controlling section 62 consists of a counter or the like in which the frequency of the basic clock MCLK is divided to generate the system clock MCLK2. In this embodiment, and for the convenience of explanation, only a flip-flop 64 and a voltage source 66 are shown as the clock controlling section 62. Also in this embodiment, the frequency of the system clock MCLK1 of the CPU section 10 is set to a value corresponding to half the frequency of the basic clock MCLK. In this regard the output Q/ (to be read as Q bar) and the input D of the flip-flop 64 are connected with each other in order to set the frequency of the system clock MCLK2 of the display controller 24 to the value corresponding to half the frequency of the basic clock MCLK.

As shown in FIG. 4B, the access controlling section 38 consists of an exclusive OR gate 68 to monitor the synchronous state between the clocks MCLK1 and MCLK2, a pair of flip-flops 70 and 72, and an AND gate 74 to control the switching operation of the address buses 32 and 34. The access controlling section 38 also includes a counter 76 to prepare a predetermined period of time suitable for the correction of the out-of-synchronism condition, a pair of flip-flops 78 and 80 to prepare the timing for the correction, and a pair of inverters 82 and 84.

First, the operation of the access controlling section 38 when both system clocks MCLK1 and MCLK2 are in a normal state 180° out of phase with each other will be described. In FIG. 5, the basic clock MCLK is illustrated in continuous manner in the normal state and in the erroneous state. The system clock MCLK1 (FIG. 5) of the CPU section 10 and the system clock MCLK2 of the display controller 24, which clocks are 180° out of phase with each other, are input to the exclusive OR gate 68 (FIG. 4B). An inverted clock of the CPU system clock MCLK1 is designated MCLK1/ (to be read as MCLK1 bar). A detection signal on line 86, designated as XOR in FIG. 5, which signal is output from the exclusive OR gate 68, is sent to AND gate 74 in the high state. The start signal of phase shift correction on line 48, designated as Q2/ (to be read as Q2 bar in FIG. 5), is applied to the AND gate 74 in a high state so that the select signal on line 36 which is output from the AND gate 74 goes either to high or low depending on the state of the system clock MCLK2 of the display controller 24. System clock MCLK2 is another input into the AND gate 74. As an example, when the system clock MCLK2 of the display controller 24 is high, the select signal on line 36 goes high, so that the display controller 24 accesses the refresh memory 20 to cyclically refresh the display on the screen of the display section 16. When the system clock MCLK2 of the display controller 24 is low, the select signal on line 36 goes low during which time the CPU section 10 can access the refresh memory 20, as required, to rewrite the display data in the refresh memory 20. Thus, the CPU section 10 and the display controller 24 can alternately access the refresh memory 20 in synchronism with the system clock MCLK2.

The detection and correction of the phase shift which occurs between the clock MCLK1 of the CPU section 10 and the clock MCLK2 of the display controller 24 will now be described. It is assumed that either one of the system clocks, MCLK1 or MCLK2, which are prepared and based on the basic clock MCLK, is selected for the operation. Assume, for example, the system clock MCLK2 is inverted due to electrostatic noise or the like at the point A in FIG. 5 and hence the phase shift occurs between both clocks. The exclusive OR gate 68 (FIG. 4B) which monitors the synchronous state of both clocks immediately provides that the detection signal on line 86 goes low (point B in FIG. 5) and outputs the same to the AND gate 74. As a result, the select signal on line 36 which is output from the AND gate 74 goes low regardless of the state of the clock MCLK2 (point C in FIG. 5), which makes the CPU section 10 accessible to the refresh memory 20. An output Q1/ (to be read as Q1 bar) of the flip-flop 70 goes high (point E in FIG. 5) in synchronism with the rising of the basic clock MCLK (point D in FIG. 5) in response to the receipt of the low detection signal on line 46 applied to the flip-flop 70. At that time, a D input of the flip-flop 72 is high so that the flip-flop 72 outputs on line 48 the low start signal of phase shift correction Q2/, as shown at point F in FIG. 5, in synchronism with the rising of the output Q1/ from the flip-flop 70. The low start signal on line 48 of phase shift correction Q2/ directly resets the flip-flop 64 of the display controller 24 to keep the clock MCLK2 at high (point G in FIG. 5). The low start signal on line 48 of phase shift correction Q2/ is also applied to the AND gate 74 to keep the select signal on line 36 at low (point H in FIG. 5). Such state of the select signal on line 36 wherein only the CPU section 10 can access the refresh memory 20 is maintained until the out-of-synchronism condition is corrected.

Further, the counter 76 counts up predetermined numbers in synchronism with the falling of the basic clock MCLK by the low start signal on line 48 of phase shift correction Q2/ and thereafter outputs a high $Q_D$ signal through a $Q_D$ output of the counter 76 (point I in FIG. 5). The flip-flop 78 provides a Q3 signal at a Q output to go high (point J in FIG. 5). In synchronism with the rising of the $Q_D$ signal and with the high Q3 signal, the flip-flop 80 provides a start signal of MCLK2, designated as Q4/ (to be read as Q4 bar in FIG. 5), to go low (point L in FIG. 5) in synchronism with the rising (point K in FIG. 5) of the inverted signal, designated as MCLK1/ (to be read as MCLK1 bar), of the system clock MCLK1 which is applied through inverter 84. The low start signal of MCLK2, designated as Q4/, directly resets the flip-flop 72 and provides the start signal of phase shift correction Q2/ to go high (point M in FIG. 5). With the high start signal of phase shift correction Q2/, the flip-flop 64 within the display controller 24 goes into a state that is operable in accordance with the basic clock MCLK. Accordingly, the flip flop 64 goes low in synchronism with the rising of the next basic clock MCLK (point P in FIG. 5). With the high start signal of phase shift correction Q2/, all of the three inputs of the AND gate 74 go high, so that the high select signal is output on line 36 from the AND gate 74 (point R in FIG. 5). After the select signal changes in accordance with the clock MCLK2, both clocks are kept in the synchronous state. The detection and correction of the phase shift between both clocks is performed in the above mentioned manner. Further, the counter 76 is cleared by the high start signal of phase shift correction Q2/ which is sent thereto on line 48. In addition, the flip-flop 78 is directly reset by the signal Q2/ which is inverted to low by the inverter 82. The low signal Q3 outputs through output Q of flip-flop 78 to an input D of the flip-flop 80. The start signal Q4/ of MCLK2 which is output from the flip-flop 80 goes high (FIG. 5, point T) in synchronism with the rising (FIG. 5, point S) of the inverted signal of the clock MCLK1 which is inverted by the inverter 84. This high start signal Q4/ of MCLK2 releases the reset state of the flip-flop 72.

In the above mentioned manner, the access controlling section 38 completely returns to its normal state to monitor the synchronous state of both clocks. Although in this embodiment, the state in which the system clock MCLK2 of the display controller 24 is inverted from low to high to cause the out-of-synchronism condition has been described, the out-of-synchronism condition can be corrected in the same manner as above when either one of the clocks, MCLK1 or MCLK2, is inverted to cause the phase shift. Also, in this embodiment, the appropriate period of the phase shift correction is defined so as to correspond to the length of an 8-cycle basic clock MCLK. However, the number of counters can be increased in accordance with the extent of the electrostatic discharge noise or the like so as to extend the period to a value corresponding to the length of a 64-cycle or a 128-cycle basic clock.

It is thus seen that herein shown and described is a CRT display device in a character display system that provides for correction of phase shift between two system clocks. The apparatus of the present invention enables the accomplishment of the objects and advantages mentioned above and, while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A character display system for a CRT, comprising clock generating means for providing a basic clock signal,
memory means for storing data to be displayed,
central processing means coupled to said clock generating means and adapted to provide a first clock signal from the basic clock signal provided by said clock generating means and coupled to said memory means for accessing thereof, a
display controller coupled to said clock generating means and adapted to provide a second clock signal from the basic clock signal provided by said clock generating means, said second clock signal being out of phase with said first clock signal to cyclically read out display data from said memory means in accordance with said second clock signal and to refresh a display on the CRT,
switch means coupled to said central processing means and to said display controller and providing an output to said memory means and switchable to selectively provide access to said memory means by said central processing means and by said display controller, and
control means coupled to said switch means for selecting access to said memory means by the central processing means and by the display controller upon occurrence of a phase shift in the system, said access selecting control means including means for detecting a phase shift of less than 180 degrees and means for correcting such phase shift between the first clock signal and the second clock signal and said access selecting control means including switch control means providing a select signal to said switch means for switching access to the memory means from the display controller to the central processing means to enable correction of the phase shift between the first clock signal and the second clock signal.

2. The character display system of claim 1 wherein said clock generating means is coupled directly to said central processing means, to said display controller, and to said access selecting control means.

3. The character display system of claim 1 wherein the memory means comprises a refresh memory for storing read and write data to be displayed and is accessible by the central processing means and by the display controller.

4. The character display system of claim 1 wherein said control means is coupled directly to said central processing means, to said display controller, and to said switch means to enable selection of said central processing means for accessing said memory means during the time of a phase shift between the first clock signal and the second clock signal.

5. The character display system of claim 1 including a driver coupled to said memory means and to said CRT and further coupled to said central processing means for enabling thereof to access said memory means during the time of a phase shift between the first clock signal and the second clock signal.

6. A CRT display apparatus comprising
memory means for storing data to be displayed,
means for generating a basic clock signal,
microprocessor means coupled to said generating means and adapted to provide a first clock signal for accessing said memory means for data to be displayed, a
display controller coupled to said generating means and adapted to provide a second clock signal that is out of phase from said first clock signal for accessing said memory means to refresh images of data displayed on the CRT in accordance with said second clock signal,
switch means for controlling access to the memory means by the microprocessor means and by the display controller and providing an output to said memory means and switchable to selectively provide access to said memory means by said microprocessor means and by said display controller, and
control means coupled to said switch means for selecting access to said memory means upon occurrence of a phase shift between the first and the second clock signals, said access selecting control means including means for detecting such phase shift of less than 180 degrees and said access selecting control means including switch control means for sending a select signal to said switch means for changing access to said memory means from said display controller to said microprocessor means, and means for correcting the phase shift between the first and the second clock signals during the time of memory means access by said microprocessor means.

7. The CRT display apparatus of claim 6 wherein the memory means comprises a refresh memory for storing read and write data to be displayed, said refresh memory being accessible by the microprocessor means and by the display controller.

8. The CRT display apparatus of claim 6 wherein said microprocessor means is a central processing unit for receiving data and is coupled to the memory means and to the CRT display.

9. The CRT display apparatus of claim 6 including a first address bus coupling said microprocessor means and said memory means and a second address bus coupling said display controller and said memory means, and a first data bus coupling said memory means and said CRT.

10. The CRT display apparatus of claim 9 including a driver coupled to said microprocessor means and to said data bus.

11. The CRT display apparatus of claim 10 including a third address bus coupling said switch means and said memory means, a second data bus coupling said microprocessor means and said driver, and wherein said driver is coupled to said memory means and to said first data bus.

12. A character display system of the synchronous access type comprising a
basic clock generating section, a
refresh memory adapted to store data to be displayed, a
central processing unit coupled to said refresh memory and adapted to prepare a first system clock signal in accordance with a basic clock signal sent from said basic clock generating section and to access said refresh memory in accordance with said first system clock signal thereby accessing said display data stored in said refresh memory, a
display controller adapted to prepare a second system clock signal which is out of phase with said first system clock signal and to access said refresh memory in alternating manner with said central processing unit and to cyclically read out said display data from said refresh memory in accordance with said second system clock signal thereby refreshing a display on a screen,
switch means coupled to said central processing unit and to said display controller and providing an output to said refresh memory and switchable to selectively access said refresh memory,
phase shift detecting means adapted to detect a state when said first and said second system clock signals are at least partially in phase with each other to output a phase shift detecting signal,
switch controlling means coupled to said switch means and adapted to couple said central processing unit with said refresh memory during the time said first and said second system clock signals are at least partially in phase with each other in response to said phase shift detecting signal, and
phase shift correcting means adapted to correct the phase shift of said first and said second system clock signals in response to said phase shift detecting signal, whereby when a phase shift occurs between said first and said second system clock signals, said phase shift is detected and corrected, said display controller is inhibited access to said refresh memory, and said central processing unit accesses said refresh memory during the time of correction of said phase shift.

13. The character display system of claim 12 including a first address bus coupling said central processing unit and said refresh memory, a second address bus coupling said display controller and said refresh memory, and a third address bus coupling said switch means and said refresh memory.

* * * * *